Sept. 4, 1962 E. D. LAAS 3,052,126
DIFFERENTIAL PRESSURE GAUGE
Filed July 1, 1959
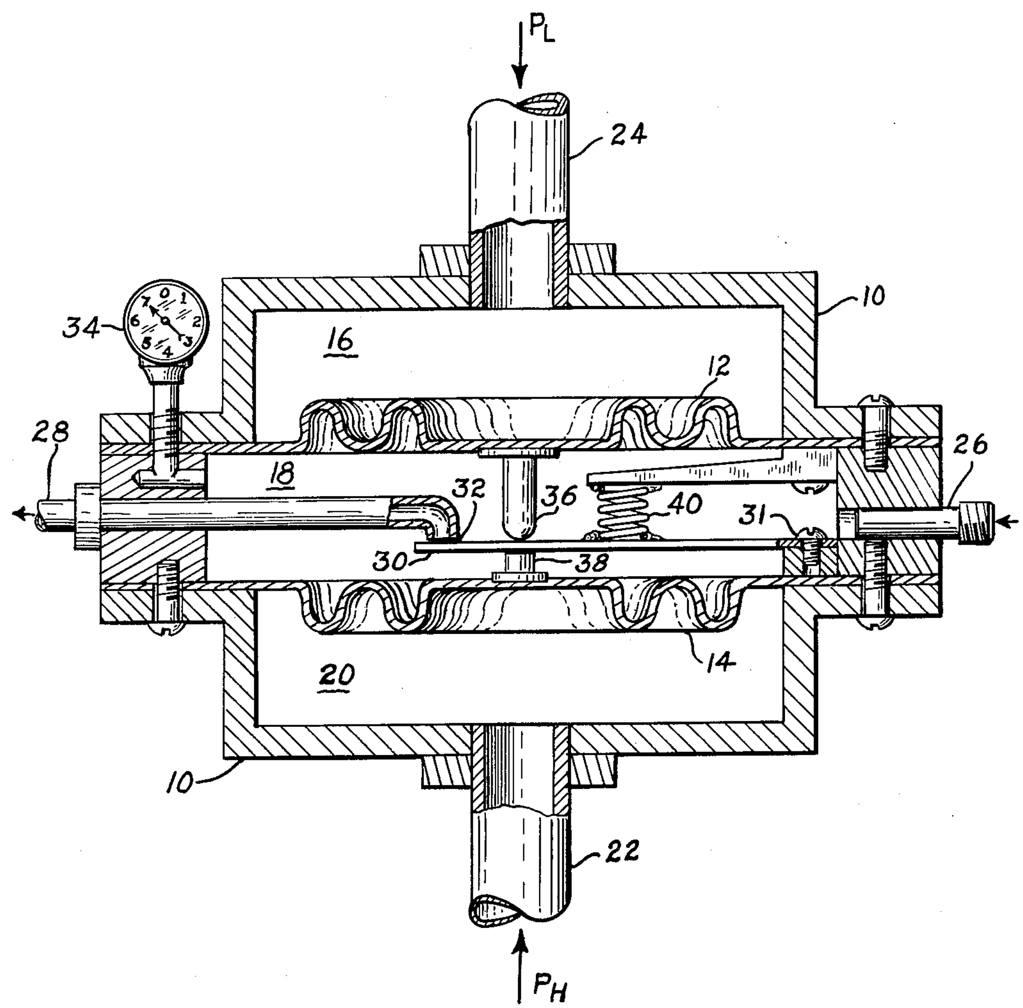
INVENTOR.
EUGENE D. LAAS
BY
Wade Koontz and
Sherman H. Goldman
ATTORNEYS 3,052,126
Patented Sept. 4, 1962

3,052,126

DIFFERENTIAL PRESSURE GAUGE

Eugene D. Laas, Needham, Mass., assignor to the United States of America as represented by the Secretary of the Air Force Filed July 1, 1959, Ser. No. 824,441
1 Claim. (Cl. 73—407)

This invention relates to differential pressure gauges and more particularly to a differential pressure gauge suitable for measuring the difference in pressure between liquid metals systems.

In measuring the pressure of liquid metals many problems arise, due principally to the clogging of small tubes and orifices. This clogging is due to "freezing" of the metals and to deposition of impurities which interfere with the operation of ordinary pressure measuring instruments which eventually cause them to fail completely. Na, and NaK, are liquid metals frequently encountered which raise problems with conventional pressure indicating devices. In Bourdon-tube sensing devices, especially in the case of Na, the following problems have arisen: (1) the gauge line has to be heated, which introduces the possibility of a temperature error; (2) the line, even though heated, is vulnerable to plugging; and (3) since plugs are difficult to locate physically, many Bourdon tubes have been ruined in attempting to melt out the plugs, owing to localized high pressure buildups. One method of using the Bourdon tube element was a gas-trap system in which the liquid metal was allowed to partially fill a tank under pressure of an inert gas, the Bourdon tube being connected to the tank through a condensing chamber. But in the case of liquid Na, vapor passed through the condensing chamber and plugged the capillary opening. Still another effort to overcome the difficulties of plugging was the use of a bellows in a null-balanced system using the transmission of a proportional air pressure for remote indication. This worked very well with NaK but with Na the sensing line became plugged and a further difficulty developed. The Na vapors condensed on the sensing bellows and seriously interfered with the accuracy of calibration.

One method of measuring the pressure of liquid metals has been found which overcomes the shortcomings of the methods just discussed. It involves the use of diaphragms as the sensing elements with compressed air balancing the liquid metals pressure, the pressure of the balancing air being taken as the liquid metals pressure. The present invention uses this principle to provide a differential pressure gauge capable of measuring the difference in pressure of two liquid metals. Its great advantage is to reduce from two to one the number of gauges necessary to read the difference in pressure between two liquid metals systems. It will have the further advantage of using a more sensitive pressure gauge, thus the difference in pressure can be measured more accurately.

Accordingly, it is an object of this invention to provide a pressure differential device which is suitable for use with liquid metals.

A further object is to provide a differential pressure device which avoids clogging or "freezing" of liquid metals.

Still another object is to provide a differential pressure gauge which is extremely accurate.

It is a further object of this invention to provide a differential pressure gauge which can be constructed of currently available materials and which lends itself to mass production techniques.

The above and still other objects, advantages and features of my invention will become apparent upon consideration of the following detailed description of one embodiment thereof, especially when taken in conjunction with the accompanying drawing, which is a sectional view showing the essential elements of the invention.

Referring to the drawing, 10 represents a housing, which is separable for ease of assembly and repairs, and is divided by compliant diaphragms 12 and 14 into three chambers 16, 18 and 20. A source of high pressure fluid is introduced into chamber 20 through a large diameter conduit 22. A source of low pressure fluid is introduced through a large diameter conduit 24 into chamber 16. The large size is considered necessary in order to avoid clogging. Air under pressure is introduced through a conduit 26 into chamber 18. Air may be bled out of chamber 18 through a conduit 28 under control of a light spring flapper 30 which controls an entrance nozzle 32 of conduit 28 to form a bleed valve structure. The flapper 30 is made fast to the housing 10 by a screw 31 and is biased by a light spring 40 in constant engagement with a post 38 carried by diaphragm 14. The flapper 30, on its upper side, is engaged with a post 36 carried by a diaphragm 12. A pressure gauge 34 indicates the pressure in chamber 18, which is the differential pressure between the pressure in chambers 16 and 20.

The operation of the device is now obvious. If the system is in equilibrium the relative clearance between the nozzle 32 and the flapper 30 will be such as to build up a pressure in chamber 18 which is equal to $P_H—P_L$, the high and low pressures respectively. Any change in either $P_H$ or $P_L$ will result in an appropriate variation in the compliant diaphragms to vary the clearance between nozzle 32 and flapper 30 which will be reflected in the pressure in chamber 18 when the system has again become balanced.

The advantage of this invention over other measuring systems is that the gauge 34 can be located at a distance without danger of clogging since the hot liquid metal and its vapors are prevented from access to the nozzle or the gauge line. Furthermore the conduits 22 and 24 are comparatively large so that clogging or "freezing" of the metals in the entrance conduits does not occur. My maintaining a close tolerance between the nozzle 32 and the flapper 30 any error introduced by the spring characteristics of the diaphragms can be neglected since the movement of the diaphragms will be very slight.

It is to be understood that the above described arrangement is merely illustrative of the applications of the principles of the invention. Numerous other arrangements may be devised by those skilled in the art without departing from the spirit and scope of the invention.

I claim:

In an instrument for measuring the differential pressures in liquid metal systems, a metallic casing forming an enclosure, two resilient metal members in said casing dividing said enclosure into an upper, a lower and a middle chamber, the upper of said chambers being connected by means of a conduit of a size to protect against clogging by liquid metals to a pressure source, the lower of said chambers being connected similarly to a second pressure source, the middle chamber being connected to a third source of pressure, means to bleed the pressure from said middle chamber in proportion to the change in pressure in either the upper or lower chambers, said means comprising a flat resilient member, an orifice controlled by said resilient member, said flat member being in contact with the upper and lower of said resilient metal members to open or close said orifice when the pressure in either the upper or lower chambers changes, and indicating means to read the pressure in said middle chamber.

References Cited in the file of this patent

UNITED STATES PATENTS

| | | |
|---|---|---|
| 2,743,735 | Du Bois | May 1, 1956 |
| 2,755,812 | Garnett | July 24, 1956 |
| 2,883,995 | Bialous et al. | Apr. 28, 1959 |
| 2,915,079 | Harrison | Dec. 1, 1959 |

FOREIGN PATENTS

| | | |
|---|---|---|
| 736,003 | Great Britain | Aug. 31, 1955 |